United States Patent [19]

Dreyer et al.

[11] Patent Number: 4,859,175
[45] Date of Patent: Aug. 22, 1989

[54] APPARATUS AND PROCESS FOR OPTIMISING COMBUSTION IN CHAMBER-TYPE FURNACES FOR BAKING CARBONACEOUS BLOCKS

[75] Inventors: Christian Dreyer, Saint Jean de Maurienne; Jean-Claude Thomas, Saint Germain en Laye; Claude Vanvoren, Saint Jean de Maurienne, all of France

[73] Assignee: Aluminium Pechiney, Paris, France

[21] Appl. No.: 156,913

[22] PCT Filed: Jun. 12, 1987

[86] PCT No.: PCT/FR87/00213
§ 371 Date: Jan. 15, 1988
§ 102(e) Date: Jan. 15, 1988

[87] PCT Pub. No.: WO87/07938
PCT Pub. Date: Dec. 30, 1987

[30] Foreign Application Priority Data

Jun. 17, 1986 [FR] France .................. 86 08987
Apr. 14, 1987 [FR] France .................. 87 05466

[51] Int. Cl.⁴ ............................. F27D 7/00
[52] U.S. Cl. ............................ 432/4; 432/5; 432/76; 432/192; 432/193
[58] Field of Search ............ 432/192, 193, 4.5, 76

[56] References Cited

U.S. PATENT DOCUMENTS

| | | | |
|---|---|---|---|
| 4,043,743 | 8/1977 | Seider .................. | 431/76 |
| 4,269,592 | 5/1981 | Benton et al. .......... | 432/192 |
| 4,284,404 | 8/1981 | Genevois et al. ........ | 432/192 |
| 4,371,333 | 2/1983 | Moser et al. ........... | 432/193 |
| 4,382,778 | 5/1983 | Peacey et al. .......... | 432/192 |
| 4,504,219 | 3/1985 | Thomas ................. | 432/4 |
| 4,568,272 | 2/1986 | Oderbolz et al. ........ | 432/5 |

FOREIGN PATENT DOCUMENTS 2129918  5/1984  United Kingdom .

Primary Examiner—Henry C. Yuen
Attorney, Agent, or Firm—Dennison, Meserole, Pollack & Scheiner

[57] ABSTRACT

The invention concerns a process and an apparatus for optimizing combustion in a furnace which has open chambers, referred to as a ring furnace, for the baking of carbonaceous blocks, the furnace comprising a plurality of preheating, baking and cooling chambers which are aligned in series, each chamber being formed by the alternating juxtaposition of hollow heating partitions in which the combustion gases circulate and compartments in which the carbonaceous blocks to be baked are stacked, the combustion gases being extracted by a suction pipe connected by delivery tubes to each of the heating partitions of the first natural preheating chamber. The apparatus is characterized in that each delivery tube 2 of the suctuion pipe is provided with a movable closure flap 11 controlled by a motor 12, a means for measuring the temperature and the depression in the corresponding partition, a means 19, 20, 21 for measuring the opacity, by reflection, of the fumes issuing from each heating partition 1, and a means for controlling the position of the closure flap 11 and therefore the flow rate in each partition 1 in dependence on the combined measurement of fume opacity, temperature and depression.

12 Claims, 5 Drawing Sheets

APPARATUS AND PROCESS FOR OPTIMISING COMBUSTION IN CHAMBER-TYPE FURNACES FOR BAKING CARBONACEOUS BLOCKS

FIELD OF THE INVENTION

The invention concerns an apparatus and a process for optimising combustion in furnaces having open chambers of baking carbonaceous blocks which are intended particularly but not exclusively for tanks for the production of aluminum using the Hall-Heroult process, but also generally for electrometallurgy.

STATE OF THE ART

The expression 'carbonaceous block' will be used hereinafter to denote any product obtained by shaping a carbonaceous paste and intended after baking to be used in electrometallurgical furnaces.

For example, carbonaceous anodes which are intended for the tanks for the production of aluminum by the electrolysis of alumina dissolved in molten cryolite are produced by shaping a carbonaceous paste resulting from working a mixture of pitch and crushed coke at around 120° to 200° C. After the shaping operation, the anodes are fired or baked for around a hundred hours at a temperature of the order of 1100° to 1200° C. Other types of carbonaceous blocks are produced by the same process.

Although there are some processes for continuous baking in a tunnel furnace, a large proportion of the baking installations which are in operation throughout the world at this date are of the 'chamber furnace' type, referred to as having 'rotary firing' (ring furnace) or having 'advancing firing'. Those furnaces are themselves divided into two categories, closed furnaces and furnaces referred to as having 'open chambers', which are the most widely used, as described in particualr in U.S. Pat. No. 2 699 931. The present invention is applied more particularly to open chamber furnaces. That type of furnace comprises two parallel arrays, the total length of which may attain more than around a hundred meters.

Each array comprises a succession of chambers which are separated by transverse walls and which are open in their upper part to permit charging with the raw blocks and unloading of the cooled baked blocks. Each chamber comprises, disposed in parallel to the major axis of the furnace, an assmebly of hollow partitions having thin walls in which the hot gases which produce the baking effect will circulate, the partitions alternating with compartments in which the blocks to be baked are stacked, being immersed in a carbonaceous dust (coke, anthracite or carbonaceous residues in crushed form or any other powder filling material). There are for example six compartments and seven partitions in alternate arrangement per chamber.

In their upper part the hollow partitions are provided with closable openings referred to as 'ports'; they aslo comprise baffle arrangements for increasing the length of and more uniformly distributing the flow of the combustion gases.

The furnace is heated by arrays of burners of a length equal to the width of the chambers and whose injectors are positioned on the port openings of the chambers in question. Upstream of the burners (in relation to the direction of advance of the firing effect), there is a combustion air blowing pipe while downstream there is a pipe for sucking away the burnt gases. Heating is effected both by combustion of the injected fuel (gas or fuel oil) and by combustion of the pitch vapours emitted by the carbonaceous blocks as they undergo baking.

As the baking process takes place, the assembly consisting of the combustion air blowing pipe, the burners and the burnt gas suction pipe is advanced every 24 hours for example, each chamber thus successively performing the functions of charging with raw carbonaceous blocks, natural preheating (by means of the combustion gases), forced preheating and baking at 1100° to 1200° C. (in the zone referred to as full firing), cooling of the carbonaceous blocks (and preheating of the combustion gases), unloading of the baked carbonaceous blocks, repair operations if required, and the resumption of a fresh cycle.

TECHNICAL PROBLEM TO BE SOLVED

The quality of the carbonaceous blocks (anodes, cathodes or lateral linings) being one of the essential elements involved in the procedure and ecomony of the Hall-Heroult process, it is necessary to optimise the baking conditions, both in order to achieve the desired level of quality and also to reduce the level of energy consumption which is of the order of 750 to 800 therms per tonne of anodes (that is to say about 870 to 930 kwh/tonne).

Good control of the firing process makes it possible to produce the programmed baking temperature at the location of each chamber, while avoiding the formation of fumes and smoke, under optimum economic conditions (good level of resistance and long service life of the refractory materials of the partitions and the minimum level of fuel consumption).

The aim which has been set is to cause the carbonaceous blocks to follow a given curve in respect of rise in temperature, while complying with the various phases involved in the baking operation.

In dependence on that curve, there is determined a theoretical curve in respect of the temperature of the gases on the partitions of the chambers under full firing conditions, which is to take account of the supply of heat due to the volatile materials. That curve generally comprises a linear portion up to around 1200° C. and then a plateau at that temperature.

For example, the final temperature for baking of the anodes, which is between 1100° and 1200° C., depends on the nature of the raw materials and it is regulated in order to impart the optimum characteristics to the anode.

Combustion of the gas or oil in the zones providing for forced preheating and full firing is effected by means of automatic installations which provide pilot control for the burners on the basis of measurements in respect of temperatures in the partitions.

On the other hand, natural preheating which largely depends on control of the ventilation effect often remains a manual control operation.

The ventilation effect for the partitions is generally adjusted in such a way that the depression in the furnace remains constant throughout each period. The furnace operators correct that reference value in respect of depression to a greater or lesser degree, in dependence on observations made in the course of inspections for checking the partitions:

delaying or advancing the heating effect in one line of partitions in comparison with the others, the presence of fumes and smoke, the condition in regard to degassing, and combustion mishaps ('referred to as 'flare-outs').

If excessively low, the depression does not cause sufficient evacuation of the fumes from combustion of the hydrocarbons (fuel oil or gas or volatile materials from the pitch). If it is excessive, the depression gives rise to an excessive admission of parasitic air due to an infiltration effect. In both cases, the heat balance sheet of the furnace suffers from a serious deterioration, and in both cases also fumes from unburnt materials may be formed (due to the insufficiency of air in the former case and due to the combustion zone spreading towards excessively cold zones in the second case).

The use of correct ventilation for optimising the levels of performance of the furnace therefore results from a compromise which depends on the experience of the furnace operators, in association with frequent observations.

In order to avoid any delay in the rise in temperature of the anodes to the level of the preheating operation, which delay is difficult and expensive to make up, the tendency of the operator is to apply depressions which are more substantial than necessary. On the other hand, with the supplies of fuel materials being cyclic (emission of volatile materials and a delivery of fuel oil or gas), the need for combustion air varies and should result in modulation of the flow rates and the levels of depression; however in practice that is impossible to achieve by manual means in an optimum and reproducible fashion.

STATE OF THE PRIOR ART

European patent application No. EP-A-133 842 describes a process for controlling a chamber-type furnace for baking carbonaceous anodes, comprising at least two parallel arrays which are connected at their ends by gas distribution conduits provided with motor-driven shutters for flow rate control, which makes it possible to control the temperature and the level of depression in the furnace, but it does not truly constitute a process for permanent optimisation of combustion.

SUBJECT-MATTER OF THE INVENTION

The subject-matter of the invention is an apparatus and a process for regulating combustion by acting on the flow rate of the fumes and smoke which are sucked in in each line of partitions by acting on the valve flaps disposed on each delivery tube of the suction pipe which is disposed downstream of the burners, further by limiting the increased pressure in the partitions of the chamber which is disposed upstream of the full-firing zone, and by adjusting the flow rate of combustion air which is injected by way of the blowing pipe.

The applicants discovered that the main most reliable parameter for providing pilot control in respect of that regulating operation was the opacity of the fumes measured by reflection of a light source at the solid particles in suspension in the fumes and not, as in conventional opacimetry, by simple transmission of light through the fumes.

More precisely, a first subject of the invention is an apparatus for regulating combustion in a chamber-type furnace for baking carbonaceous blocks, wherein each delivery tube of the suction pipe and the blowing pipe is provided with a movable closure flap controlled by a motor, a means for measuring the depression in the corresponding heating partition at the pre-heating zone, a means for measuring opacity by reflection of the fumes issuing from each heating partition, a means for measuring temperature which is separate from that used for the automatic devices for pilot-control of the burners, and a means for controlling the position of the closure flap of the suction pipe and therefore the flow rate in each partition in dependence on the combined measurement of the fume opacity, temperature and depression.

In addition, in order to optimise combustion regulation, there is provided a device for measuring the increased pressure in the partitions of the chamber which is disposed upstream of the full-firing zone, associated with means for comparing that measurement to a reference value, and on the other hand a means for varying the combustion air flow rate which involves acting on the speed of the fan injecting the combustion air into the blowing pipe, as well as a means for measuring said air flow rate.

A second subject of the invention is a process for optimising combustion in chamber-type furnaces for baking anodes using the apparatus described, wherein the position of the movable closure flaps of the suction pipe is controlled in dependence on measurements in respect of opacity of the fumes and the depression in the pre-heating chambers, so as to operate with the minimum depression compatible with good combustion and the programmed curve in respect of rise in temperature of the combustion gases, and to remain at the minimum level of opacity of the fumes.

In addition, and for the same purpose of optimising combustion:

on the one hand, a controlled increased pressure is maintained in the partitions of the chamber which is disposed rearwardly (downstream) of the full-firing zone, so as not to interfere with the injection of fuel (liquid or gaseous) by way of the burners; for that purpose the closure flaps of the blowing pipe are operated; and on the other hand, the flow rate of combustion-supporting gas which is injected by way of the blowing pipe (which is fed by a controllable flow fan) is adjusted so as to produce complete combustion of the combustible material which is partly formed by the fuel injected in the burners and partly by the volatile fractions of the pitch which are emitted by the carbonaceous blocks in the course of baking.

BRIEF DESCRIPTION OF THE DRAWINGS

FIG. 1 (in section) and FIG. 2 (in partly cut-away form) recall the general structure of furnaces with open chambers of the 'advancing firing type', to assist with full comprehension of the invention, FIG. 3 is a diagrammatic plan view of the structure of an openchamber furnace according to the invention, FIG. 4 is a sectional view of the practical use of the invention in relation to the suction pipe, in a first embodiment, FIG. 5 shows the device for measuring fume opacity, FIGS. 6 and 7 show two alternative embodiments of fume opacimetry, and FIG. 8 is a diagrammatic view of the variation in respect of time of the temperature TA of the anodes in the course of baking, the production of volatile materials emitted by the anodes and the energy comsumption for burning the fuel injected by the burners plus the volatile materials.

Description Of The Preferred Embodiments

Figure 1:
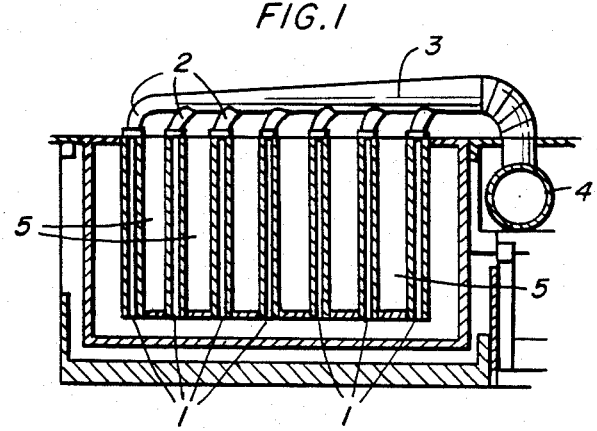
FIGS. 1 to 8 illustrate the invention.

Referring to the sectional view in FIG. 1, shown therein are the partitions 1 which are connected in their upper part by way of delivery tubes or nozzles 2 to the pipe 3 which is itself connected to the general manifold 4. The blowing and suction pipes which are of practically the same structure may be connected, depending on the particular circumstances involved, to the port openings of the chambers or to the port openings of the transverse walls, as we have described in our French patent No. 2 535 834 (corresponding to British patent specification No. 2 129 918). Disposed in the compartments 5 are the carbonaceous blocks, for example the anode 6, which can be seen in the cut-way view in the left-hand part in FIG. 2, being encased in a carbonaceous granular material (not shown).

The baffles 7 of the heating partitions are provided to increase the length of the flow path of the hot gases and thereby to homogenise the temperature of the products in the compartments 5.

In the upper part of the chambers (or the transverse walls) the closable ports 8 permit the positioning of assemblies of burners (not shown), the air blowing and suction pipes and, in certain cases, measuring apparatuses (thermocouples and depression-measuring devices).

The successive chambers are separated by transverse walls 9. The major axis of the furnace is indicated by the line XX'.

Figure 2:
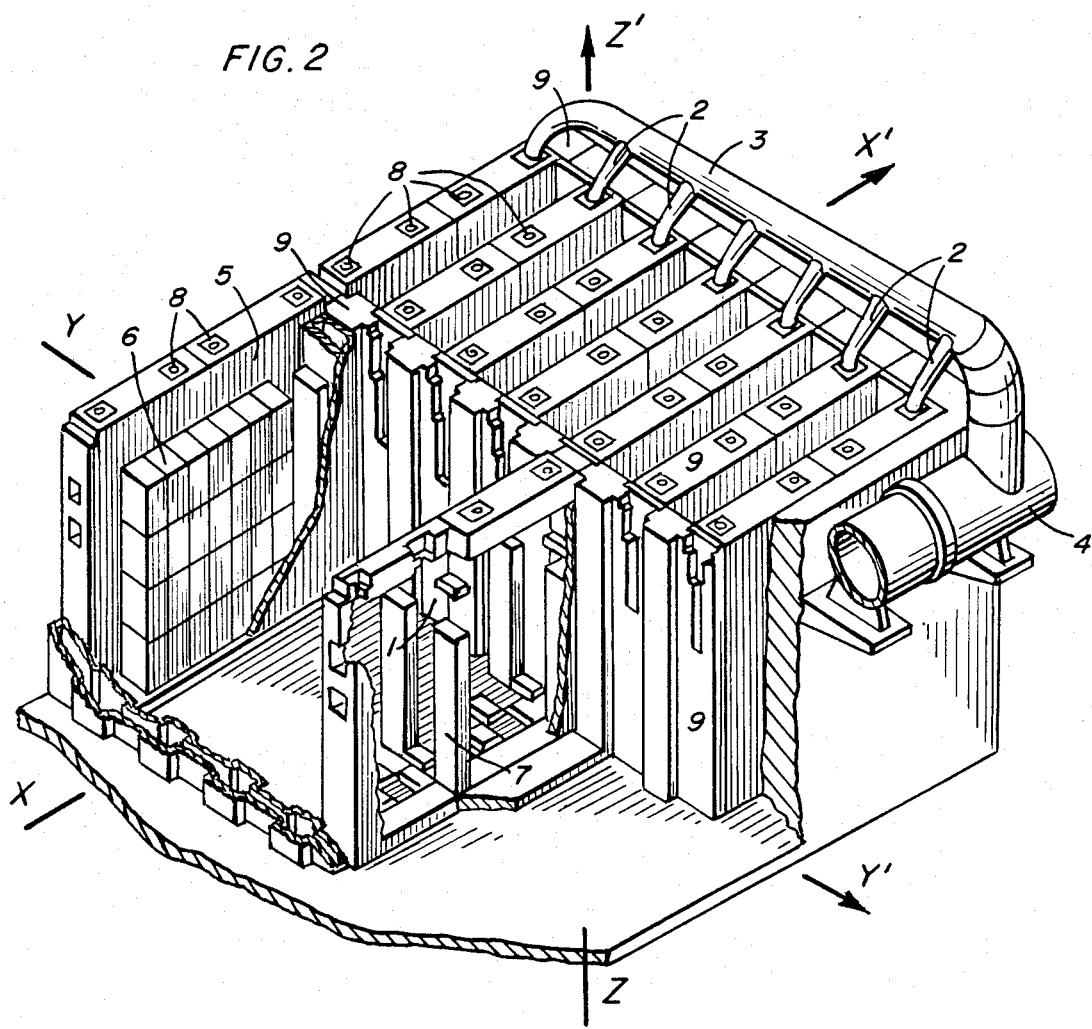
Figure 3:
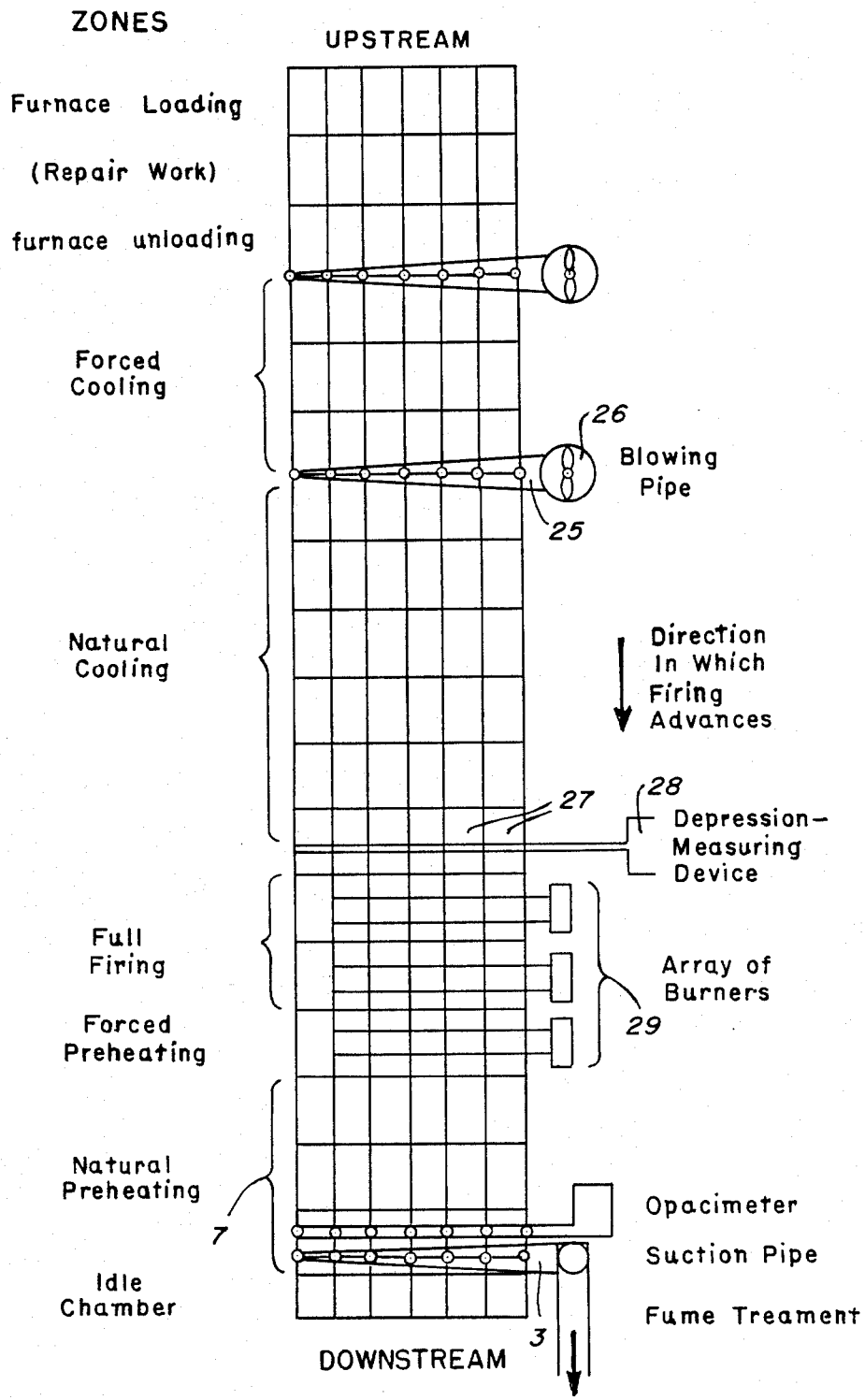

In accordance with the invention, a movable shutter flap 11 is disposed on each delivery tube 2 between the suction pipe 3 and the corresponding port opening 8, the flap 11 being controlled by a motor 12 (the term 'motor' is used here in its broadest sense, embracing for example control by means of a hydraulic jack or by a motorised mechanism). The suction pipe 3 is disposed on the first chamber which involves natural preheating (FIGS. 2 and 3). The delivery tubes of the blowing pipe 25 are also provided with motorised movable flaps, for a purpose which will be described in greater detail hereinafter.

Figure 4:
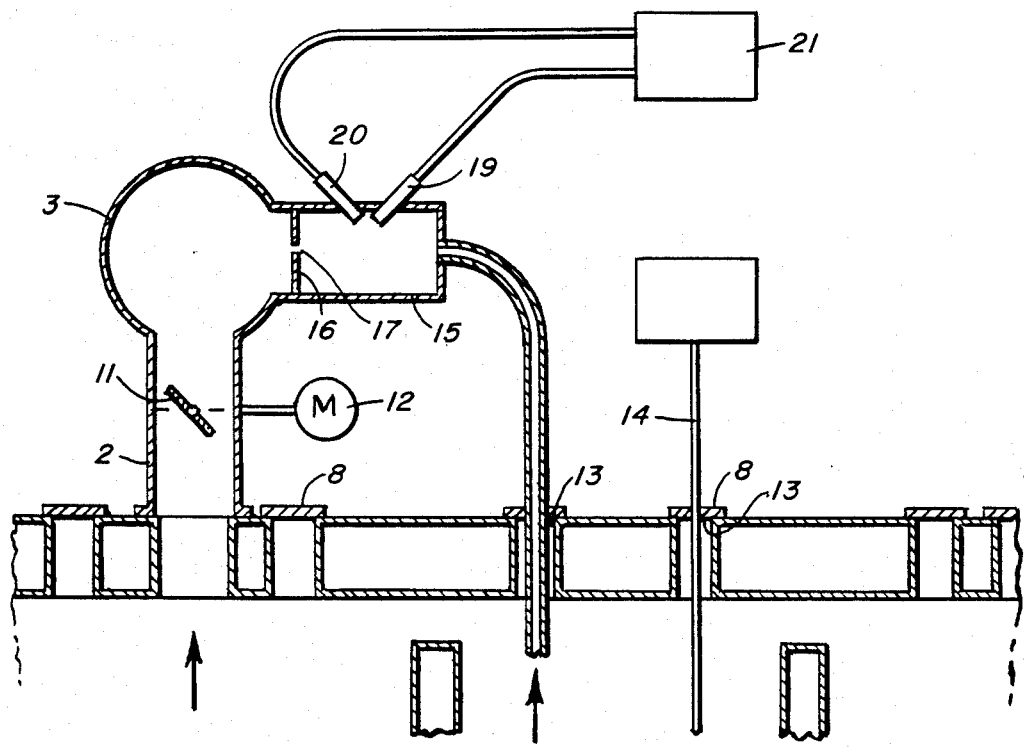
Figure 5:
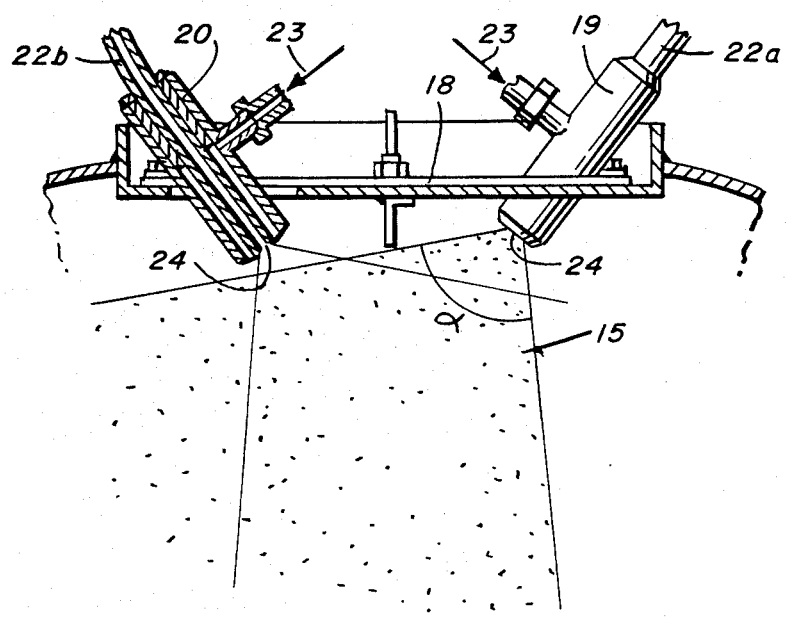

In theory, fume opacity could be measured directly in the delivery tube 2. However, due to the turbulence in the fumes and smoke at that location, which makes it difficult to make stable and reproducible measurements, the choice has been made to take off fumes and smoke which are subjected to an opacimetry operation in a particular orifice 13 such as those which are provided for introducing the temperature or depression measuring probes 14, the fumes and smoke taken off being passed into a measuring chamber 15 connected to the suction pipe 10 by way of a partition 16 provided with a through orifice 17 forming a diaphragm (see FIG. 4).

Figure 6:
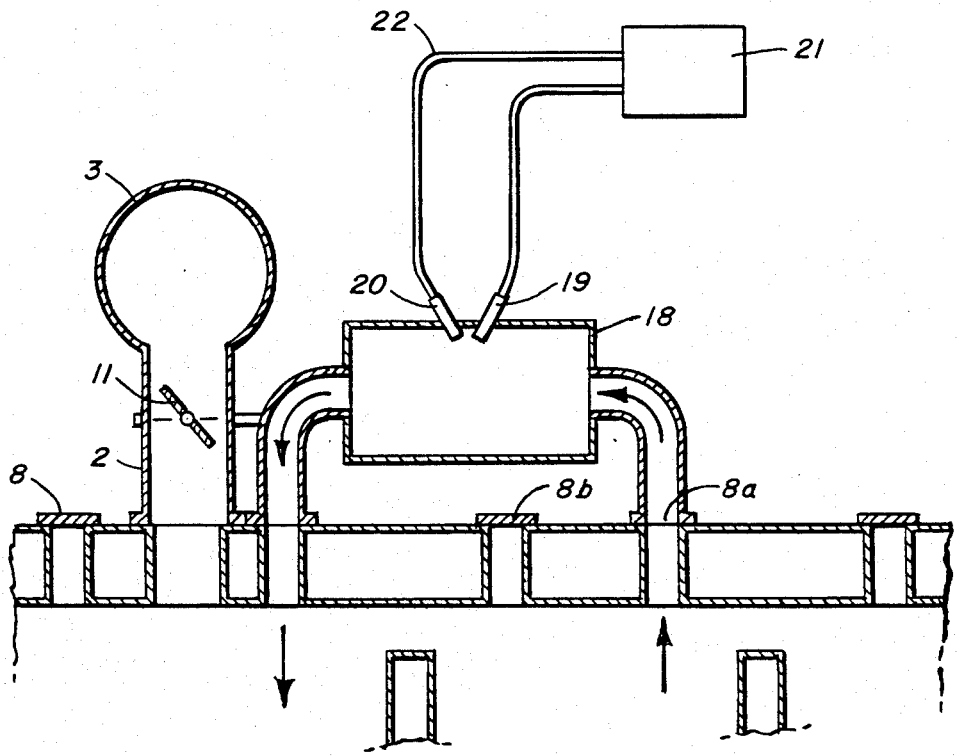

Another way of not being adversely affected by the turbulence in the fumes and smoke comprises using an auxiliary chamber 18, as shown in FIG. 6, as the measuring chamber; a part of the flow of the fumes and smoke is diverted in by-pass relationship, provided that the intake is connected to an opening 8A corresponding to a rising flow zone and the outlet is connected to an opening 8B corresponding to a descending flow.

Figure 7:
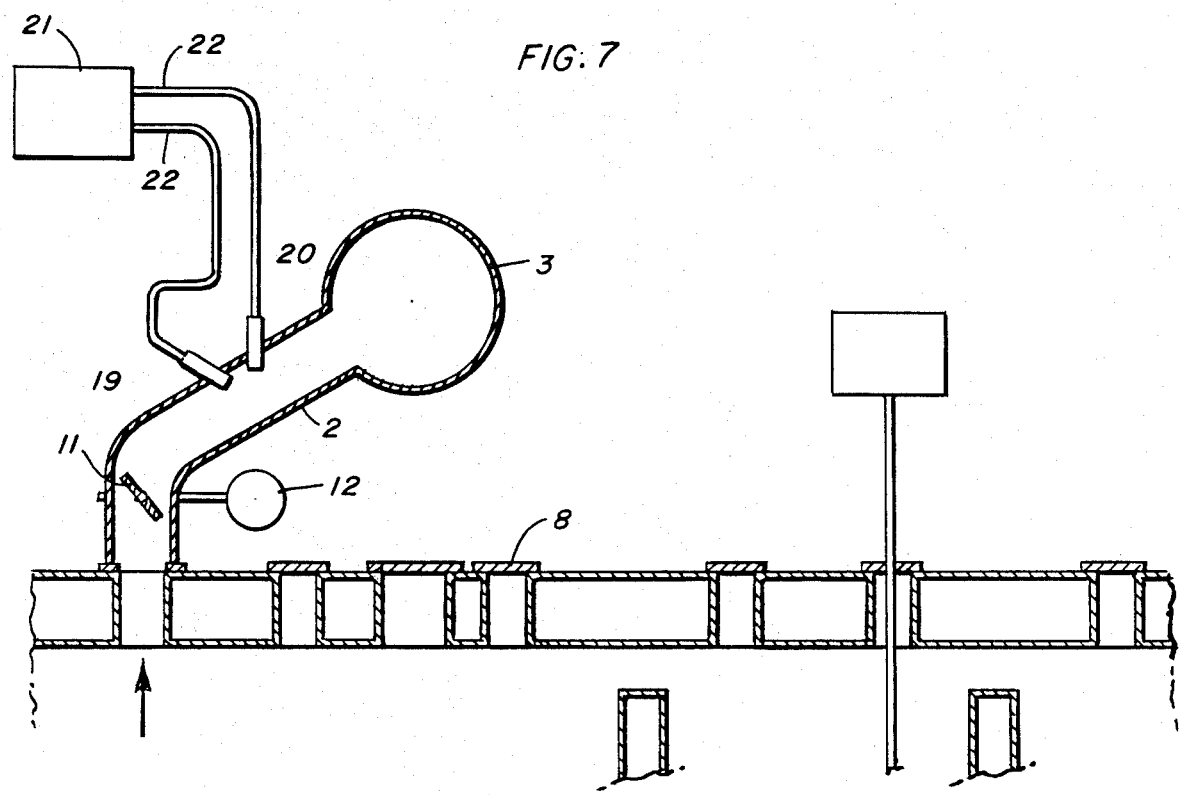

FIG. 7 shows another embodiment in which the delivery tube 2 is of a straight length which is sufficient to provide that the turbulence therein is relatively limited and does not interfere with opacity measurement.

The measuring probes are disposed on a rigid plate forming the upper part of the measuring chamber.

The opacimetry means comprises:
an emitter probe 19
a receiving probe 20
a measuring box 21, and
a connection by way of optical fibres 22 between each probe 19, 20 and the measuring box 21.

The emitter probe 19 is connected by way of the optical fibre 22A to a light source which emits modulated visible light, disposed in the box 21.

The axis of the emitter probe 19 which illuminates the smoke and fumes in the chamber forms an angle of about 45° to the plane of the wall of the chamber 18. The situation is the same in regard to the receiving probe 20 which is disposed at around 10 centimeters from the emitter probe 19.

The axes of the two probes form an angle of about 80° to each other. In that way the light emitted by the probe 19 cannot in any manner directly reach the probe 20 which picks up only the light reflected by the solid particles in suspension in the smoke and fumes (unburnt materials and dust) and which are diagrammatically represented by the small black dots in FIG. 7 (the above-indicated value of 80° is given by way of indication).

The reflected light is passed by way of the optical fibre 22B to the box 21 where it is detected by photodiodes. The modulated electrical signal is freed of any parasitic continuous component and then linearly converted into an analog (or digital) output signal which, after processing and setting to the required level, provides pilot control for the motor 12 for controlling the position of the movable flap 11 disposed in the delivery tube 2. In addition the same signal can be translated by preliminary calibration into milligrams of solid particles per cubic meter of fumes and smoke.

Regulation of the whole of the chamber furnace, on the basis of the above-indicated principle, implies that the apparatus is installed on each of the outlets of heating partitions which may be for example seven in number (being the case shown in FIGS. 2 and 3).

The measuring box 21 may be common to all the opacimeters, while each way or channel may be provided with a separate detector-amplifier, or a single multiplexed detector-amplifier.

Having regard to the elevated temperature which obtains in the region of the furnace, the box 21 is to be disposed at a certain distance therefrom, which may be of the order of one or more tens of meters.

Communication by optical fibres permits a temperature which can be up to 350° C. and if necessary 400° C., if a few precautions are taken. Preferably the emitter and receiving probes comprise an auxiliary circuit 23 for scavenging with fresh air, the aim of which is to prevent the deposits of solid materials on the end 24 of the optical fibre.

DESCRIPTION OF THE REGULATION EFFECT

The function of the regulation effect is to optimise baking of the anodes, that is to say to impose on the carbonaceous blocks and the gases a curve in respect to rise in temperature which permits each phase of the baking operation to take place under the optimum conditions, while reducing the consumption of fuel to the strict minimum and therefore optimising the combustion conditions.

The baking temperature follows a reference curve, regulation particular to each array of burners controls the frequency and the amplitude of the injections of fuel in the different burners (which operate intermittently). The injection operations are effected by means of pulses of predetermined duration and frequency assigned by the automatic system of the regulation arrangement. The temperature which is taken into account for the regulation effect is the temperature of the gases as measured after the burners.

Following the measurement of opacity of the gases in the natural preheating zone makes it possible to define the action to be carried out on the depression so as to set the two parameters to the optimum value. The optimisation operation is effected by following in parallel the variation in the temperature of the gases with respect to a reference curve in the same zone. An excessive difference in relation to the required temperature will cause the action on the depression to be modulated.

Experience has shown that a slight variation in depression gives rise to a rapid and substantial variation in the temperature of the gases in the natural preheating zone.

The regulation operation which takes account both of the variation in the temperature of the gases in the natural preheating zone and the measurements of opacity of those gases and depression, in accordance with a specific algorithm acts on the flow rate of gases in each line of partitions.

It is therefore necessary to provide a motorised flap 11 on each of the delivery tubes 2 connecting the suction pipe 3 to the port openings of each chamber in question.

Although in theory each line of heating partitions 1 is independent and isolated from the other lines, experience has shown that a variation in the depression in a partition 1 may have more or less marked repercussions on the depression in the other partitions. Accordingly it is preferable not to control the depression in each partition independently of the depression and temperature measured in the other partitions of the chamber in question, but to compare them together and to treat them in accordance with a particular algorithm so as to avoid any abrupt variation at any one of the shutter flaps.

A regulation cycle may for example take place under the following conditions:

(A) The depression is initialised at a value of between 0 and 250 Pa and more particularly between 40 and 180 Pa by regulating the flap 1 and the measured opacity value is allowed to stabilise. Then, in a repetitive procedure:

(B) The entire range of depression between 0 and 250 Pa and more particularly between 40 and 180 Pa is scanned to find the minimum depression X for minimum opacity Y of the fumes and smoke, as measured after a stabilisation period of at least 30 seconds.

(C) The position of the flap 11 in the suction pipe 3 is regulated for a depression value which falls in the range $X \pm \Delta X$ for a level of opacity maintained in a range $Y \pm \Delta Y$ around the minimum Y.

(D) In parallel therewith, the real curve in respect of the rise in temperature TG of the gases in the natural preheating zone is compared to a reference curve. The system is regulated around a minimum depression corresponding to a minimum level of opacity Y so as to maintain the temperature TG of the gases in the preheating zone in a range $T \pm \Delta T$ about the reference point (an increase in depression will result in an increse in the temperature of the gases).

In addition, there is a time delay upon an increase in opacity outside of the range $Y \pm \Delta Y$ so as to return to the phase B only if the level of opacity is still outside that range at the end of the delay period.

Finally, in the unfaouvrable situation where opacity measurements Y and temperature measurements TG would give rise to an antagonistic action on the flap 11, opacity will be temporarily put aside in order to provide as a priority measure for a correct increase in the temperature TG of the gases in the natural preheating zone.

In addition, it is possible further to refine the effect of optimisation of combustion:

on the one hand, by optimising the flow rate of combustion-supporting gas, that is to say air, which is injected by way of the blowing pipe 25, by acting on the flow rate of the fan 26 so as to inject the amount of oxygen which is necessary and sufficient to produce total combustion of the combustible material and the volatile materials and to keep to the minimum level of fume opacity;

on the other hand, by acting by means of the regulation effect on the shutter flaps of the blowing pipe 25 (which are identical to the flaps 11 of the suction pipe and which are motorised in the same manner) so as to maintain an over pressure of between 0.5 and 5 mm and preferably between 1 and 2 mm water gauge (that is to say respectively 4.9 to 49 Pa, preferably 9.8 to 19.6 Pa, which values can be rounded off to from 5 to 50 Pa, preferably from 10 to 20 Pa) in the partitions of the chambers which are disposed rearwardly of the full-firing zone (reference 27 in FIG. 2).

A check is possibly made to ensure that that regulation effect does not give rise to a substantial drop in the temperature TG of the gases in the partitions in question.

To achieve that result:

(1) Disposed on one of the lines of port openings of the chamber 27 preceding the full-firing zone is an array 28 of depression-measuring devices comprising as many measuring nozzles as the furnace comprises partitions (being 7 in the case in question), a reference value is fixed in respect of the over pressure, for example 2 mm WG (that is to say $\approx 20$ Pa), the measured values are compared to the reference value, and the motorised controls of the flaps for regulating the blowing pipe are operated so as to adjust the over pressure to the reference value thereof.

(2) The flow rate of combustion air is adjusted in the following manner:

The fuel used is formed in respect of a first part by the gas or oil injected in the arrays of burners 29. That injection is effected by calibrated pulses of frequency and duration which are assigned by the regulating device in accordance with the program in respect of the rise in temperature, each pulse corresponding to a predetermined amount of fuel. Therefore recording the number and duration of the pulse makes it possible to ascertain the amount of fuel injected. The other part of the fuel derives from the volatile materials emitted by the caronaceous blocks in the course of preheating: indeed, the carbonaceous blocks are formed by a carbonaceous aggregate and a binding agent which in most cases is a pitch.

The amount of volatile materials is known in the following manner:

The temperature TG of the gases on the natural preheating chambers is measured. By means of a mathematical model ( and experimental verification), a curve has been established in respect of the correlation between the temperature TG of the combustion gases which circulate in the partitions and the real temperature TA of the anodes in the natural preheating chambers.

Figure 8:
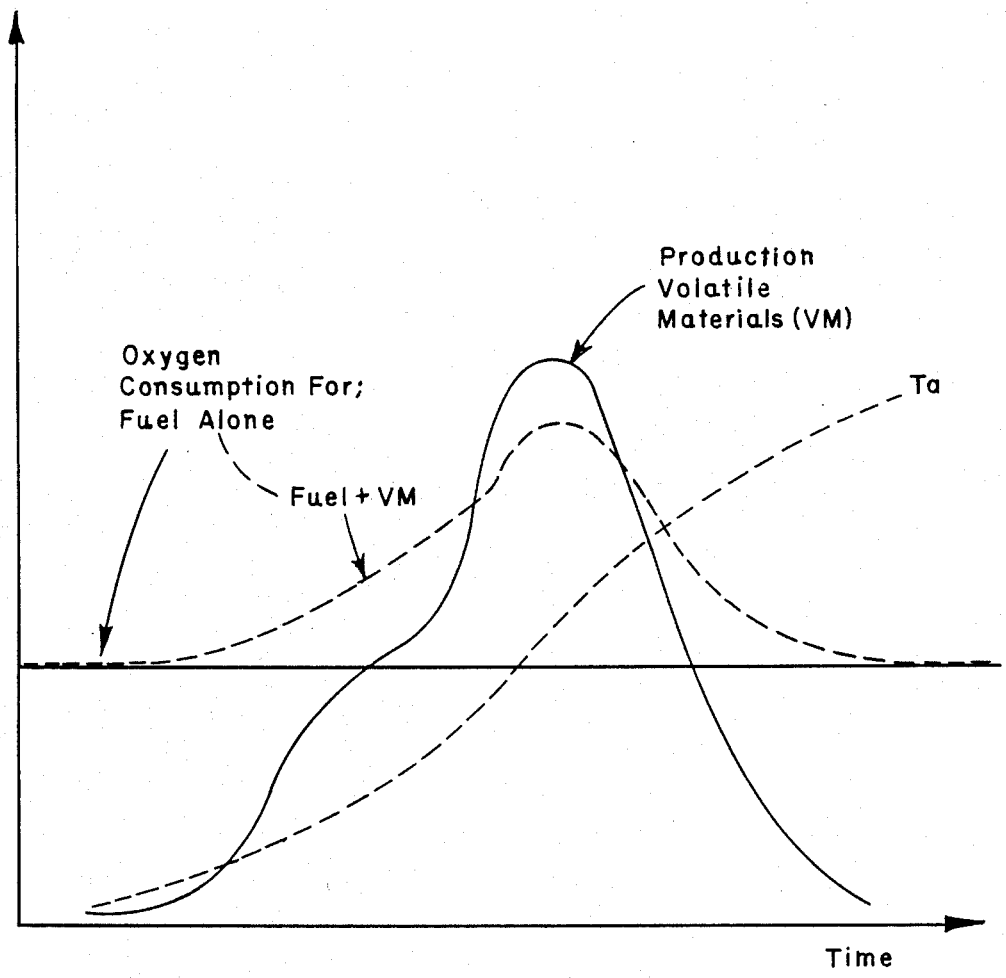

Also, by using a mathematical model and experimental measurements, the curve has been established in respect of the production of volatile materials in dependence on the temperature TA of the anodes (FIG. 8). Finally, the proportions of C and H in the volatile materials and therefore the amount of oxygen necessary to burn C to form $CO_2$ and H to form $H_2O$ were also determined.

Therefore, by measuring the temperature TG and the amount of fuel injected per unit of time, it is thus possible to deduce the total amount of oxygen necessary to provide for complete combustion. It is therefore only necessary to regulate the flow rate of the fan 26 while maintaining a constant increased pressure in the partitions of the chambers disposed downstream of the full-firing zone, in order to adjust it permanently to the amount of oxygen necessary to produce optimum combustion, which is confirmed by a minimum level of fume opacity, measured as indicated above.

EXAMPLE

The invention has been applied to an industrial chamber-type furnace producing anodes for a series of electrolysis tanks operating at 280 KA. The furnace comprises 40 chambers which are distributed in two parallel lines, each chamber comprising six compartments alternating with seven heating partitions.

The opacimetry chamber which is mounted in shunt relationship between the first and third port openings is a horizontal cylinder with a diameter of 500 mm and 90 mm in length. The diameter of the intake passage 25A and the outlet passage 25B is 100 mm (FIG. 6).

The two probes are disposed at about 100 mm apart and form an angle of about 80° (value given by way of indication) between them.

The regulating flaps are controlled by motorised jacks which are themselves pilot-controlled from the regulating box.

The apparatuses for measuring temperature (thermoelectric couples) and depression are conventional.

The limits fixed in respect of the variations in depression are 40 to 180 Pa, with initialisation at 80 Pa.

The increased pressure in the last natural cooling chamber downstream of the full-firing zone was maintained in the region of 20 Pa.

After six months of operation, a drop in the level of energy consumption for baking the anodes of about 15 to 16% was observed.

Among the other advantages of the process, the following points should be noted:

practical total automation of management of the baking process;

immediate detection of mishaps at the burners and of abnormal intakes of cold air;

a substantial reduction in the dimensions of the system for processing the gases emitted by the furnace;

in addition, by virtue of precise quantitative control of the amount of combustion air injected, the process provides for a double action in regard to opacity: by regulating the depression at the closure flaps 11 of the suction pipe 3 and by regulating the flow rate of air injected by the blowing fan 26. Accordingly there is very little danger of involving incomplete combustion; and finally it is possible reliably to provide for an increase in the service life of the furnace or more precisely an increase in the length of the periods of time between periodic operations for restoration of the chambers.

The invention is applied to baking all types of carbonaceous blocks: anodes and cathodes for the electrolysis of aluminum, cylindrical electrodes for electrometallurgy, and electrodes and other shaped components which are intended to be subsequently graphitised.

What is claimed is:

1. Apparatus for optimizing combustion in a chamber or ring furnace for baking carbonaceous blocks, said furnace comprising a plurality of preheating, baking and cooling chambers aligned in series, each chamber being formed by an alternating juxtaposition of hollow heating partitions 1 in which combustion gases circulate and compartments 5 in which the carbonaceous blocks to be baked are stacked, a suction pipe 3 for extracting combustion gases from the furnace, a plurality of delivery tubes 2 connecting said suction pipe to the partitions of the first, preheating, chamber in said series, and a blowing pipe 25 connected to said furnace for injection, via a fan 26, of combustion air, said apparatus comprising:
a movable closure flap 11 associated with each said delivery tube 2, a motor means 12 for controlling each said closure flap 11, means for measuring the temperature and reduction in pressure in each partition to which a delivery tube is connected, means 19, 20, 21 for measuring the opacity, by reflection, of gases in each said partition of said first chamber, and means for controlling the position of each said closure flap 11, and thereby combustion gas flow rate in each said partition of said first chamber in dependence on opacity, temperature and reduction in pressure.

2. Apparatus according to claim 1, comprising a means for regulating the flow rate of the fan 26 and a means for measuring said flow rate.

3. Apparatus according to claim 1 or claim 2 wherein the blowing pipe 25 is connected to said furnace via a plurality of delivery tubes which are also provided with movable closure flaps controlled by a motor.

4. Apparatus according to claim 1 or claim 2, comprising an array of reduction in pressure measuring devices disposed in openings of the partitions of the preheating chamber preceding the baking chamber.

5. Process for optimizing combustion in a chamber or ring furnace for baking carbonaceous blocks, said furnace comprising a plurality of preheating, baking and cooling chambers aligned in series, each chamber being formed by an alternating juxtaposition of hollow heating partitions 1 in which combustion gases circulate and compartments 5 in which the carbonaceous blocks to be baked are stacked, a suction pipe 3 for extracting combustion gases from the furnace, a plurality of delivery tubes 2 connecting said suction pipe to the partitions of the first, preheating, chamber in said series, a movable closure flap 11 associated with each said delivery tube 2, and a blowing pipe 25 connected to said furnace for injection, via a fan 26, of combustion air, said process comprising the steps of:
(a) regulating said closure flap 11 so as to set a reduction in pressure in each partition 1 of said first chamber at a predetermined value between 0 to 250 Pa, and measuring, by reflection after stabilization, the opacity value, of combustion gases in each partition of said first chamber;
(b) adjusting the reduction in pressure to values throughout the range between 0 to 250 Pa, measuring by reflection, after a stabilization period of at least 30 seconds the opacity value of the combustion gases at each said pressure value, and determining the minimum reduction in pressure necessary to achieve a minimum opacity value;

(c) regulating the position of each flap 11 to maintain the reduction of pressure at approximately said minimum, to maintain opacity at approximately said minimum value; and (d) in parallel with steps (b) and (c), measuring the rise in termperature of the gases in said first chamber, comparing said rise to a reference curve of the desired baking temperature, and regulating said minimum reduction in pressure so as to maintain the temperature in a range around the reference curve and opacity at approximately said minimum value;

whereby the reduction in pressure in said chambers is maintained at a minimum value compatible with optimum combustion conditions, and the temperature in said first chamber is maintained as close as possible to the reference curve.

6. A process according to claim 5, wherein steps (b), (c) and (d) are repeated.

7. A process according to claim 6 wherein a time delay is introduced in the event of an increase in opacity outside of the approximate minimum valve so as to return to step b only if the opacity is still outside that range at the end of the delay period.

8. A process according to claim 5 or 6, wherein in the unfavorable situation where the opacity measurements and the temperature measurements result in an antagonistic action on the flap 1, opacity measurements are temporarily set aside in order to ensure as a priority factor a correct increase in the temperature of the gases in the natural preheating zone.

9. A process according to claim 5 or 6, wherein an over pressure is created in the partitions of the chambers 3 which are disposed downstream of the baking chambers, to a value between 5 and 50 Pa.

10. A process according to claim 5 or 6, comprising regulating the flow rate of the fan 26 so as permanently to inject the necessary amount of air which is sufficient to produce complete combustion both of volatile materials given off in the course of baking of the carbonaceous blocks, and fuel used to heat the furnace.

11. A process according to claim 9 wherein the amount of volatile materials given off by the carbonaceous blocks in the course of the baking operation is known by measuring the temperature TG of the gases in the partitions of the preheating chambers from which there is deduced by preliminary calibration the real temperature TA of the carbonaceous blocks, to which there is applied a correlation function as between TA and the amount of volatile materials given off, taking account of the initial pitch content of the carbonaceous blocks.

12. A process according to claim 9, wherein said over pressure has a value between about 10 and 20 Pa.

* * * * *